US008423616B2

(12) United States Patent
Pouzin et al.

(10) Patent No.: US 8,423,616 B2
(45) Date of Patent: Apr. 16, 2013

(54) IDENTIFYING AND CORRELATING ELECTRONIC MAIL MESSAGES

(75) Inventors: Dominic J. Pouzin, Sammamish, WA (US); Ilana Rae Smith, Frederiksberg (DK)

(73) Assignee: Microsoft Corporation, Redmond, WA (US)

( * ) Notice: Subject to any disclaimer, the term of this patent is extended or adjusted under 35 U.S.C. 154(b) by 628 days.

(21) Appl. No.: 11/799,990

(22) Filed: May 3, 2007

(65) Prior Publication Data

US 2008/0275957 A1   Nov. 6, 2008

(51) Int. Cl.
G06F 15/16 (2006.01)
G06F 15/173 (2006.01)
G06F 15/177 (2006.01)

(52) U.S. Cl.
USPC .......................... 709/206; 709/207; 709/238

(58) Field of Classification Search .................. 709/206, 709/207, 238
See application file for complete search history.

(56) References Cited

U.S. PATENT DOCUMENTS

| | | | |
|---|---|---|---|
| 6,704,772 B1 | 3/2004 | Ahmed et al. | |
| 2002/0091772 A1 | 7/2002 | Yong | |
| 2004/0059789 A1 | 3/2004 | Shum | |
| 2004/0073617 A1* | 4/2004 | Milliken et al. | 709/206 |
| 2005/0091321 A1* | 4/2005 | Daniell et al. | 709/206 |
| 2006/0004794 A1* | 1/2006 | Pizzo et al. | 707/100 |
| 2006/0031356 A1 | 2/2006 | Drouet et al. | |
| 2006/0059033 A1 | 3/2006 | Wagner et al. | |
| 2006/0095521 A1 | 5/2006 | Patinkin | |
| 2006/0143274 A1* | 6/2006 | Schulz et al. | 709/206 |
| 2006/0155715 A1* | 7/2006 | Duffek et al. | 707/100 |

(Continued)

FOREIGN PATENT DOCUMENTS

| | | |
|---|---|---|
| JP | 10-187561 A | 7/1998 |
| JP | 11-45258 | 2/1999 |

(Continued)

OTHER PUBLICATIONS

Discussions in Microsoft Dynamics CRM Deployment; Published Mar. 2006; Retrieved from http://www.microsoft.com/Businesssolutions/Community/NewsGroups/dgbrowser/en-us/default.mspx?&lang=&cr=&guid=&sloc=en-us&dg=microsoft.public.crm.deployment&p=1&tid=4a218d54-710d-4abc-9d21-b9c81f4f7ad2&mid=60b330d2-112a-49e3-a866-e8013ebf8d15; hereinafter, CRM.*

(Continued)

Primary Examiner — Haresh N Patel
Assistant Examiner — Chau Le
(74) Attorney, Agent, or Firm — Hope Baldauff Hartman, LLC

(57) ABSTRACT

Technologies are described herein for identifying and correlating e-mail messages. The contents of the subject and recipients fields of e-mail messages received at and sent from a computing system are hashed and stored in a database. When an incoming e-mail message is received at the computing system, the contents of its subject and recipients fields are also hashed. A search is then made of the database to locate e-mail messages identified in the database that have a sufficient number of subject and address hash values that match the subject and address hash values generated for the incoming e-mail message so that the messages may be correlated. A correlation is made between the incoming e-mail message and the best matching e-mail message located during the search of the database.

12 Claims, 5 Drawing Sheets

U.S. PATENT DOCUMENTS

| | | | |
|---|---|---|---|
| 2006/0168006 | A1 | 7/2006 | Shannon et al. |
| 2006/0212299 | A1 | 9/2006 | Law |
| 2006/0235933 | A1 | 10/2006 | Baluja et al. |
| 2006/0259556 | A1 | 11/2006 | Auhagen |
| 2007/0038841 | A1 | 2/2007 | Longinov et al. |
| 2007/0050456 | A1 | 3/2007 | Vuong et al. |

FOREIGN PATENT DOCUMENTS

| | | |
|---|---|---|
| JP | 2004-289491 | 10/2004 |
| JP | 2006-041815 | 2/2006 |
| JP | 2006-252220 | 9/2006 |
| WO | WO 2004/032439 | 4/2004 |
| WO | WO 2005/025155 | 3/2005 |

OTHER PUBLICATIONS

"Microsoft Business Solutions CRM and IBM Lotus Notes Domino, Being Two Groupware Products from Competing Software Development Leaders, However Coul", http://www.contentmart.com/ContentMart/contentasp?LinkID=12404&CatID=44&content=1.

"Microsoft Dynamics CRM Team Blog", http://blogs.msdn.com/crm/archive/2006/09/18/761115.aspx.

International Search report dated Sep. 30, 2008 in International Application No. PCT/US2008/061104.

"Microsoft Business Solutions CRM and IBM Lotus Notes Domino, Being Two Groupware Products from Competing Software Development Leaders, However Could coexist within one organization computer network and even work in collaboration," downloaded Jan. 9, 2007 from http://www.contentmart.com!ContentMart/content.asp?LinkID=12404&CatID=44&content=1, 3 pages.

"Microsoft Dynamics CRM Team Blog", downloaded Jan. 9, 2007 from http://blogs.msdn.com!crm!archive/2006/09/181761115.aspx, 3 pages.

Chinese Official Action dated Apr. 29, 2011 in Chinese Application No. 200880014354.4.

Chinese Official Action dated Feb. 28, 2012 in Chinese Application No. 200880014354.4.

European Search Report dated May 2, 2012 in European Application No. 08746511.8.

Chinese Official Action dated Aug. 29, 2012 in Chinese Application No. 200880014354.4.

Japanese Official Action dated Oct. 26, 2012 in Japanese Application No. 2010-507512.

Japanese Notice of Allowance dated Feb. 22, 2013 in Japanese Application No. 2010-507512.

\* cited by examiner

IDENTIFYING AND CORRELATING ELECTRONIC MAIL MESSAGES

BACKGROUND

Customer relationship management ("CRM") systems allow businesses to manage the relationships with their customers, including the capture, storage, and analysis of customer information. In many CRM systems, electronic mail ("e-mail") is the preferred method of communicating with customers. When an e-mail is sent from a CRM system to a customer, a sent e-mail activity is created in the CRM system to track the communication. The sent e-mail activity may be associated with a customer order, a customer account number, or other type of information that uniquely identifies the context of the e-mail message.

When a customer replies to an e-mail message sent from a CRM system, many CRM systems will create a new response e-mail activity. In order to group all related e-mail activities for a particular context, it is necessary to identify e-mail messages as being CRM-related and, if so, to correlate each related response e-mail activity with other pre-existing e-mail activities. In this way, each response e-mail activity will be linked to the same customer order or customer account number as the original, pre-existing e-mail activities. Quick access can then be had to all of the communications to and from a customer using only the customer account number or customer order.

In the past, several methods have been utilized to identify response messages and to correlate response e-mail messages with a pre-existing e-mail message. These previous methods, however, each suffer from significant drawbacks. In the first method, an e-mail conversation thread identifier is inserted into an x-mailer header ("x-header") of each sent e-mail message. If the thread identifier is present in the response e-mail, it can be utilized to correlate the response e-mail to the original e-mail. While this method is generally suitable for e-mail messages sent on a local area network, this method generally does not work for messages sent over the Internet. This is because many Internet e-mail servers systematically strip x-headers from incoming and outgoing mail messages. As a result, response e-mail messages from these systems will not include the original thread identifier, thereby making correlation using the thread identifier impossible.

In the second method, a tracking code is placed in the subject line, message body, or another field of a sent e-mail message. If the tracking code is present in the same field of the response message, the tracking code can be utilized to correlate the response message with the originally sent e-mail. However, the use of a tracking code is seen by some organizations as being intrusive in that it frequently requires the tracking code to be placed in a visible e-mail field like the subject line. As a result, some organizations are unwilling to place such data in the fields of e-mail messages sent from their CRM systems. Moreover, a tracking code placed in the subject field or message body of an e-mail message is subject to modification or deletion, which makes identification and correlation impossible. A tracking code placed in the message body of an e-mail may also require significant processing to locate, because the entire message body of the e-mail must be searched to locate the tracking code.

It is with respect to these considerations and others that the disclosure made herein is provided.

SUMMARY

Technologies are described herein for identifying and correlating e-mail messages. Through aspects presented herein, incoming response e-mail messages can be identified and correlated with related pre-existing e-mail messages without requiring the use of x-headers to store thread identifiers. Moreover, incoming response messages can also be identified and correlated to related e-mail messages or other CRM objects without requiring a tracking code or any other type of tracking data to be placed within the fields of outgoing e-mail messages.

According to one aspect presented herein, incoming response e-mail messages are identified and correlated with related e-mail messages utilizing the contents of e-mail fields that are not stripped by Internet mail servers. For instance, in one implementation, the subject and recipient fields of e-mail messages sent from or received at a computing system are processed for use in identifying and correlating incoming e-mail messages. In particular, in one embodiment the contents of the subject field of incoming and outgoing messages are tokenized. Through the tokenization process, noise words and terms commonly prepended to e-mail subject fields (e.g. "Re:", "Fw:", etc.) are removed. A unique hash value, referred to herein as a subject hash value, is then generated for each of the elements in the subject field.

The e-mail addressees specified in the recipient fields of each sent or received e-mail message are also processed. In particular, a hash value, referred to herein as an address hash value, is generated for the e-mail addresses in each of the recipient fields (e.g. "To:", "From:", "CC:", "Bcc:", etc.) of a sent or received e-mail message. The subject hash values and the address hash values for each sent or received e-mail message are then stored in a database, such as a structured query language ("SQL") database. In one implementation, a record is inserted into the database for each e-mail message that includes an identifier for the e-mail message along with the address hash values and subject hash values generated for the e-mail message. The use of the hash values in the manner presented herein allows related e-mail messages to be quickly identified while using a minimal amount of database storage space.

When an incoming e-mail message is received, the data stored in the database is utilized to identify the e-mail message as being related to one or more previous e-mail messages, and to correlate the incoming e-mail message with one or more of the e-mail messages identified in the database. In particular, in one implementation, the subject field of the incoming e-mail message is tokenized and subject hash values are generated for each of the tokens. Address hash values are then generated for the e-mail addresses of each of the recipients of the incoming e-mail message. Once the subject hash values and address hash values have been generated for the incoming e-mail message, these values are compared to values in the database to correlate the incoming e-mail message to one or more related e-mail messages identified in the database or other CRM objects.

In one embodiment, the incoming e-mail message is identified as being related to a message in the database or other CRM object by performing a search of the database for records stored therein that have at least a threshold number of address hash values that match the address hash values generated for the incoming e-mail message. Once this search has been performed, the incoming message is correlated by identifying candidate e-mail messages by searching the results for records having a second threshold number of subject hash values that match the subject hash values generated for the incoming e-mail message. According to implementations, the various threshold values may be adjusted in order to improve the likelihood of an accurate correlation.

Once the candidate e-mail messages have been identified, the incoming e-mail message is correlated with one or more of the candidate e-mail messages. In one implementation, the incoming e-mail message is correlated with the most recently modified candidate e-mail message. Through the correlation, an association is made between the incoming e-mail message and the existing e-mail message identified in the database. The incoming e-mail message may also be correlated with another type of CRM object, such as a user account number or order. If no candidates are identified, the incoming e-mail message is not correlated with any of the e-mail messages identified in the database. The incoming e-mail message may also be correlated with multiple existing e-mail messages in order to re-create an entire conversation thread across many e-mail messages.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
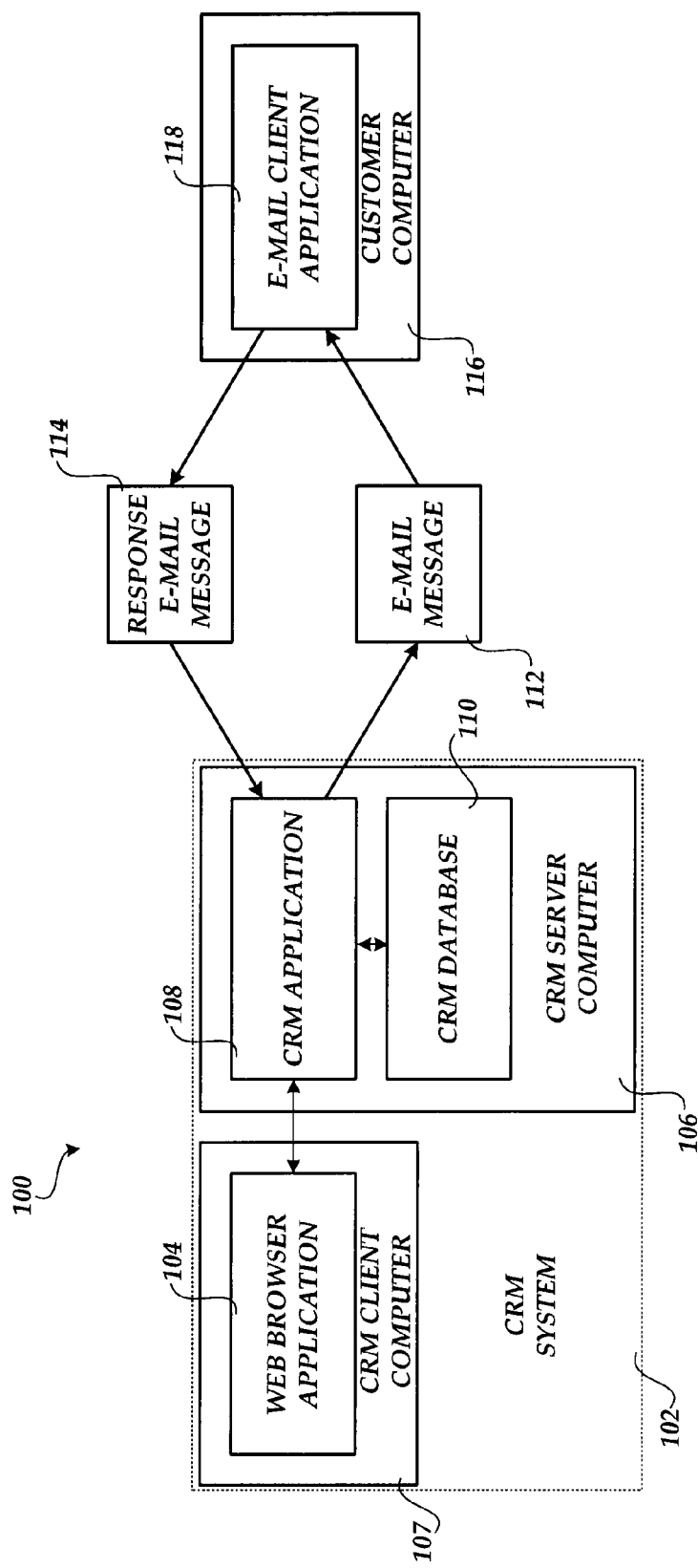
FIG. 1 is a network diagram showing an illustrative network computing architecture and several software components provided by one embodiment described herein.

The following detailed description is directed to technologies for identifying and correlating e-mail messages. Through the embodiments presented herein, an incoming e-mail message can be correlated to a related pre-existing e-mail message or related CRM object without the use of tracking tokens or thread identifiers. In this way, an incoming e-mail message can be correlated with a related e-mail message or CRM object without placing any data into outgoing e-mail messages.

As will be described in greater detail below, the implementations presented herein utilize the contents of e-mail fields that are not generally removed or modified by Internet e-mail servers to identify and correlate incoming e-mail messages with related pre-existing e-mail messages or other CRM objects. According to aspects presented herein, the contents of the subject and recipient fields of each e-mail message sent from or received at a computing system are hashed and stored in a database. When an incoming e-mail message is received, the contents of the subject and recipient fields of the incoming e-mail message are also hashed. The computed hash values for the incoming e-mail message are then compared to values stored in the database to determine if there is a sufficient nucleus of common subject matter and recipient e-mail addresses to identify the incoming e-mail message as being related to one of the e-mail messages identified in the database. If so, the incoming e-mail message is correlated with the related e-mail message. The incoming e-mail message may also be correlated with a related CRM object in a similar manner. Additional details regarding this process will be described below with respect to FIGS. 1-5.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for correlating e-mail messages will be described. In particular, FIG. 1 is a network and software architecture diagram that provides details regarding an illustrative operating environment for the embodiments presented herein along with aspects of several software components presented herein.

The illustrative computing system shown in FIG. 1 includes a CRM system 102. The CRM system 102 includes a CRM server computer 106 that executes a CRM application 108 and maintains an associated CRM database 110. The CRM system 102 provides functionality for managing relationships with business customers, including the capture, storage, and analysis of customer information. This data is stored by the CRM application 108 in the CRM database 110. Customer data stored in the CRM database 110 may be associated with a customer number, order number, or other type of CRM object. According to implementations, the CRM database 110 is a structured query language SQL database. It should be appreciated, however, that any type of database technology may be utilized to embody the CRM database 110.

The CRM functionality provided by the CRM application 108 may be accessed through the use of a web browser application 104 executing on the CRM client computer 107. In this manner, the CRM client computer 107 can be utilized to access functionality provided by the CRM application 108 for creating and viewing customer information, for communicating with customers via the CRM system 102, and for performing other CRM-related functions. The CRM system 102 utilizes e-mail as a primary method of communicating with customers.

When an e-mail message 112 is sent from the CRM system 102 to a customer computer 116, a copy of the sent e-mail message 112 is created in the CRM database 110 to track the communication. The copy of the sent e-mail message 112 may be associated with a customer order, a customer account number, or other type of CRM object that uniquely identifies the context of the e-mail message. As will be described in greater detail below, data contained in the e-mail message 112 sent from the CRM system 102 is also processed and stored in the CRM database 110 for use in identifying related messages and correlating these messages with related pre-existing e-mail messages identified in the CRM database 110. Details regarding this process are provided below with respect to FIGS. 2-4.

Customers receive e-mail messages sent from the CRM application 108 using an e-mail client application 118 executing on the customer computer 116. Customers may also receive such e-mail messages through the use of a web browser application program and a hosted web mail service. In response to receiving the e-mail message 112, a customer may utilize the e-mail client application 118 or a hosted web mail service to transmit a response e-mail message 114 to the CRM system 102. For instance, a customer may transmit a response e-mail message 114 to inquire about an order they have placed.

When the CRM application 108 receives the response e-mail message 114, an attempt is made to identify the message as being CRM-related and, if so, to correlate the response e-mail message 114 with a related e-mail message identified in the CRM database 110, such as the e-mail message 112. As will be described in greater detail below, the contents of various fields contained within the incoming response e-mail message 114 are analyzed and compared to data stored in the CRM database 110 for other e-mail messages to identify and correlate the response e-mail message 114 to a pre-existing related e-mail message. Additionally, once the response e-mail message 114 has been properly correlated to a related e-mail message 112, data contained in the response e-mail message 114 is also processed and stored in the CRM database 110 for use in correlating future incoming e-mail messages. By identifying and correlating all related e-mail messages in this manner, all related communications for a customer may be associated and accessed together. Details regarding the various processes provided herein for identifying and correlating e-mail messages in the CRM system 102 are discussed below with respect to FIGS. 2-4.

Figure 2:
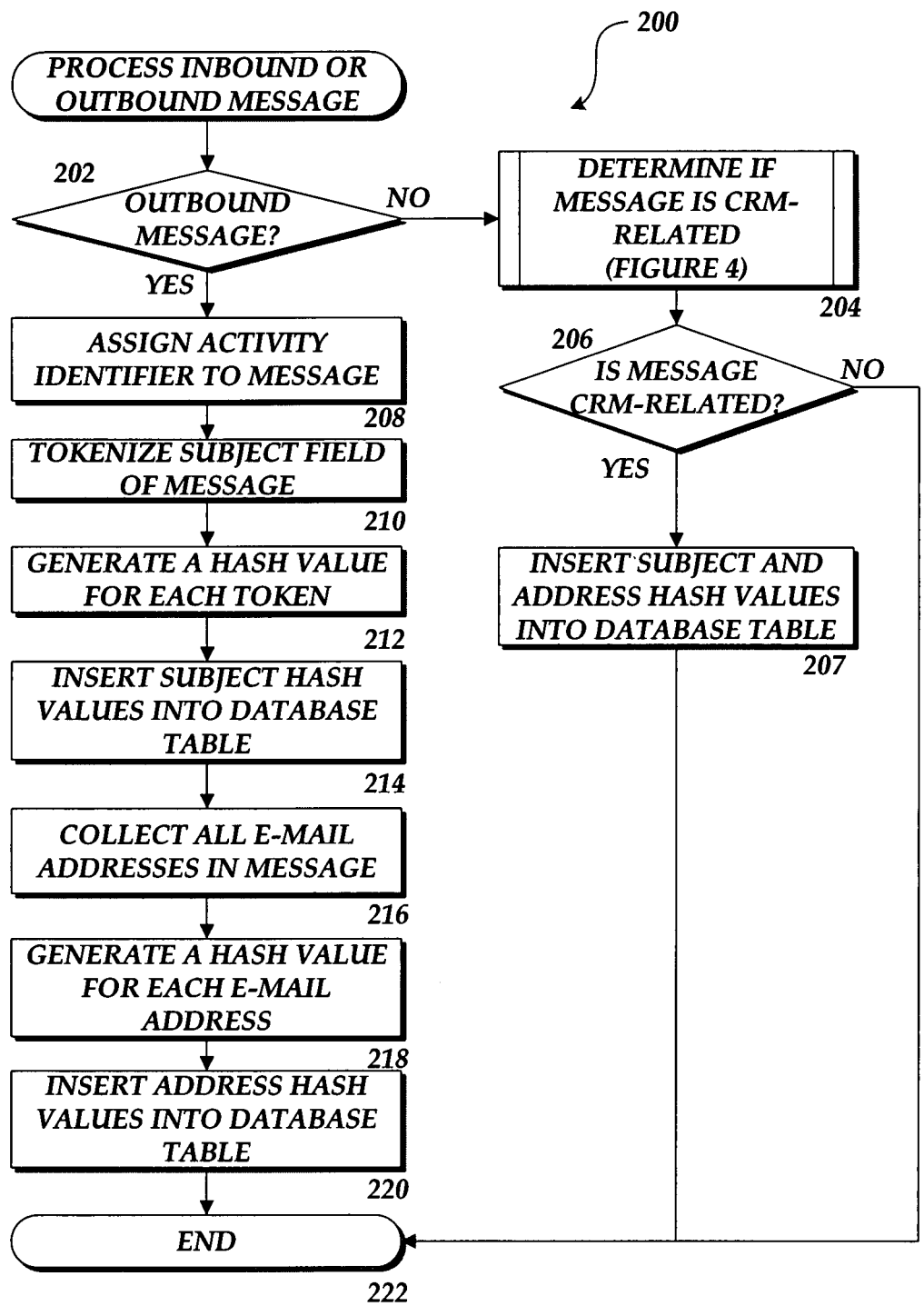
FIG. 2 is a flow diagram showing an illustrative process for processing incoming and outgoing e-mail messages utilized in one embodiment presented herein.

Referring now to FIG. 2, additional details will be provided regarding the embodiments presented herein for identifying and correlating e-mail messages. In particular, FIG. 2 is a flow diagram showing a routine 200 that illustrates aspects of the operation of the CRM application 108 for processing incoming and outgoing e-mail messages in one implementation described herein. As described briefly above, the CRM application 108 processes the contents of several fields of e-mail messages sent from and received at the CRM system 102 for use in correlating incoming e-mail messages to e-mail messages stored in the CRM database 110. FIG. 2 shows one illustrative embodiment utilized by the CRM application 108 for performing this processing. FIG. 2 will be described in conjunction with FIG. 3, which illustrates the contents of an illustrative e-mail message 112 and aspects of the CRM database 110.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein with respect to the various figures.

Figure 3:
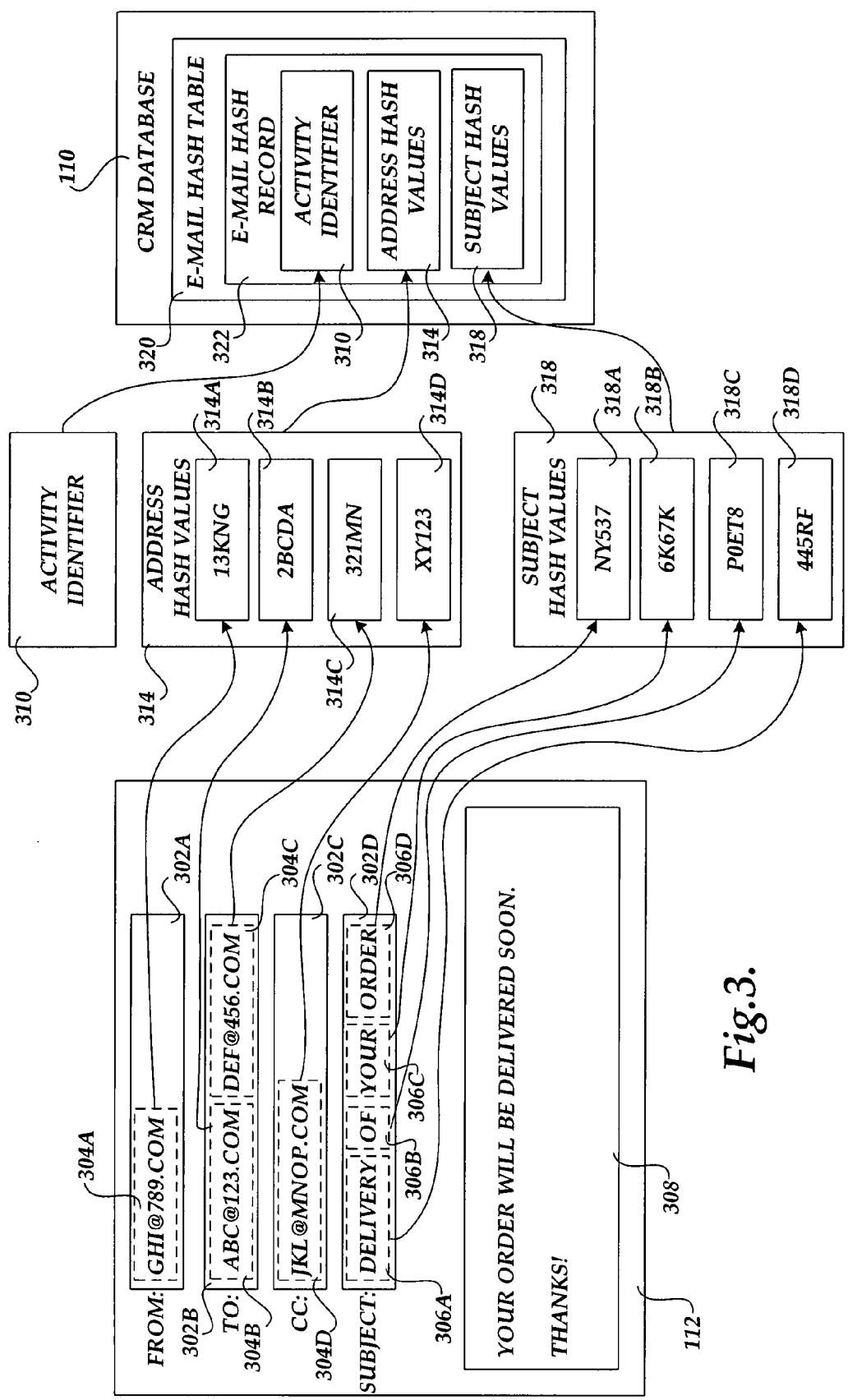
FIG. 3 is a data structure diagram showing the contents of an illustrative e-mail message and a database utilized in one implementation described herein.

As discussed briefly above, the CRM application 108 processes each e-mail message sent by or received at the CRM system 102. FIG. 3 shows an illustrative e-mail message 112 that has been sent by the CRM application 108. As shown in FIG. 3, the e-mail message 112 includes a number of fields 302A-302D. In particular, the e-mail message 112 includes three recipient fields 302A-302C. The recipient fields 302A-302C are utilized to store e-mail addresses for the various recipients of the e-mail message 112. For instance, the "from:" field 302A stores the e-mail address 304A, the "to:" field 302B stores the e-mail addresses 304B and 304C, and the "cc:" field 302C stores the e-mail address 304D. It should be appreciated that an e-mail address may have additional recipient fields not shown in FIG. 3.

The e-mail message 112 also includes a subject field 302D and a body field 308. The subject field 302D is utilized to store an alphanumeric subject for the e-mail message 112. The body field 308 is utilized to store the main body of the e-mail message 112. In the example e-mail message 112 shown in FIG. 3, the body field 308 stores a message to a customer regarding shipment of an order. As will be described in detail below, the CRM application 108 processes the contents of the fields 302A-302D to generate data for use in identifying and correlating incoming e-mail messages to e-mail messages identified in the CRM database 110. It should be appreciated that although the illustrative e-mail message 112 shown in FIG. 3 is an outgoing e-mail message being sent from the CRM system 102, the process described with reference to FIG. 2 is performed with respect to both incoming and outgoing messages.

The routine 200 begins at operation 202, where a determination is made as to whether a message inbound to the CRM application 108 or a message outbound from the CRM application 108 is being processed. If an outbound message is being processed, the routine 200 proceeds from operation 202 to operation 208. If an inbound message is being processed, the routine 200 proceeds from operation 202 to operation 204, described below.

At operation 208, the CRM application 108 assigns the e-mail message 112 an activity identifier 310 ("activity ID"). The activity ID 310 uniquely identifies the context of the e-mail message 112. For instance, the activity ID 310 may be utilized to correlate the e-mail message 112 to other related e-mail messages, to a related customer account or order number, or to another type of CRM object. In the case of an outgoing e-mail message 112, the activity identifier 310 is known by the CRM application 108.

From operation 208, the routine 200 continues to operation 210 where the CRM application 108 tokenizes the contents of the subject field 302D of the e-mail message 112. In one implementation, all leading words of a predetermined format in the subject field 302D are ignored. For instance, any word or phrase that ends in a colon may be ignored. This permits the quick removal of phrases commonly added to e-mail subject fields (e.g. "Re:", "Fw:", etc.). Alternately, a list of words to be removed from the subject field may be consulted to determine which words should be removed. This list may be customized by an administrator, such as the addition of new words or the removal of words from the list. The remaining content is then lexically analyzed to identify the word tokens contained within the subject field 302D. For instance, through an application of the tokenization process to the illustrative contents of the subject field 302D shown in FIG. 3, the tokens 306A-306D would be identified.

Once the tokens 306A-306D contained in the subject field 302D have been identified, the routine 200 continues to operation 212 where a hash value is generated for each of the tokens 306A-306D. The hash values for the tokens 306A-306D are referred to herein as the subject hash values 318. For instance, in the example shown in FIG. 3, a subject hash value 318A is generated for the token 306A, a subject hash value 318B is generated for the token 306B, a subject hash value 318C is generated for the token 306C, and a subject hash value 318D is generated for the token 306D. It should be appreciated that any suitable hash function may be utilized to generate the subject hash values 316. In embodiments, the hash function generates secure hashes from a secret key. Fixed, compact hashes may also be utilized.

From operation 212, the routine 200 continues to operation 214, where the subject hash values 316 are inserted into an e-mail hash record 322 in an e-mail hash table 320 stored in the CRM database 110. The e-mail hash table 320 includes an e-mail hash record 322 for each incoming and outgoing e-mail message and, as will be described in greater detail below, is utilized to correlate incoming e-mail messages to pre-existing related messages identified in the CRM database 110. Each e-mail hash record 322 also includes the activity ID 310 for the corresponding e-mail message and one or more address hash values 314. Generation of the address hash values 314 is described below.

From operation 214, the routine 200 continues to operation 216, where the e-mail addresses in each of the recipient fields 302A-302D are collected. The routine 200 then continues to operation 218, where a hash value is generated for each of the collected e-mail addresses. These hash values are referred to herein as address hash values 312. For the illustrative e-mail message 112 shown in FIG. 3, the address hash value 314A is generated from the e-mail address 304A, the address hash value 314B is generated from the e-mail address 304B, the address hash value 314C is generated from the e-mail address 304C, and the address hash value 314D is generated from the e-mail address 304D. Any suitable hash function may be utilized to generate the address hash values 312 from the e-mail addresses 304A-304D.

From operation 218, the routine 200 continues to operation 220, where the address hash values 312 are inserted into the appropriate e-mail hash record 322 in the e-mail hash table 320. It should be appreciated that the processes shown at operations 208-220 of FIG. 2 and described above are repeated for each e-mail message that is transmitted from the CRM system 102. In this manner, an e-mail hash record 322 is created for each outbound e-mail message. As will be described in greater detail below with respect to FIG. 4, the CRM application 108 utilizes the contents of the e-mail hash records 322 to correlate incoming e-mail messages with pre-existing e-mail messages identified in the CRM database 110. From operation 220, the routine 200 continues to operation 222, where it ends.

If, at operation 202, it is determined that an inbound message from the CRM application 108 is being processed, the routine 200 proceeds from operation 202 to operation 204. At operation 204, a determination is made as to whether the inbound e-mail message is CRM-related and, if so, it is correlated to one or more existing e-mail messages. An illustrative process will be described below with reference to FIG. 4 for identifying an e-mail message as being CRM-related and for correlating an incoming e-mail message to one or more pre-existing related e-mail messages identified in the CRM database 110.

If the inbound message is identified as being CRM-related, the routine 200 proceeds from operation 206 to operation 207, where the subject hash values and address hash values for the incoming e-mail message are stored in the database 110. The routine 200 then proceeds from operation 207 to operation 222, where it ends. If the inbound e-mail message is not CRM-related, the inbound message is ignored. The routine 200 therefore proceeds directly from operation 206 to operation 222, where it ends.

Figure 4:
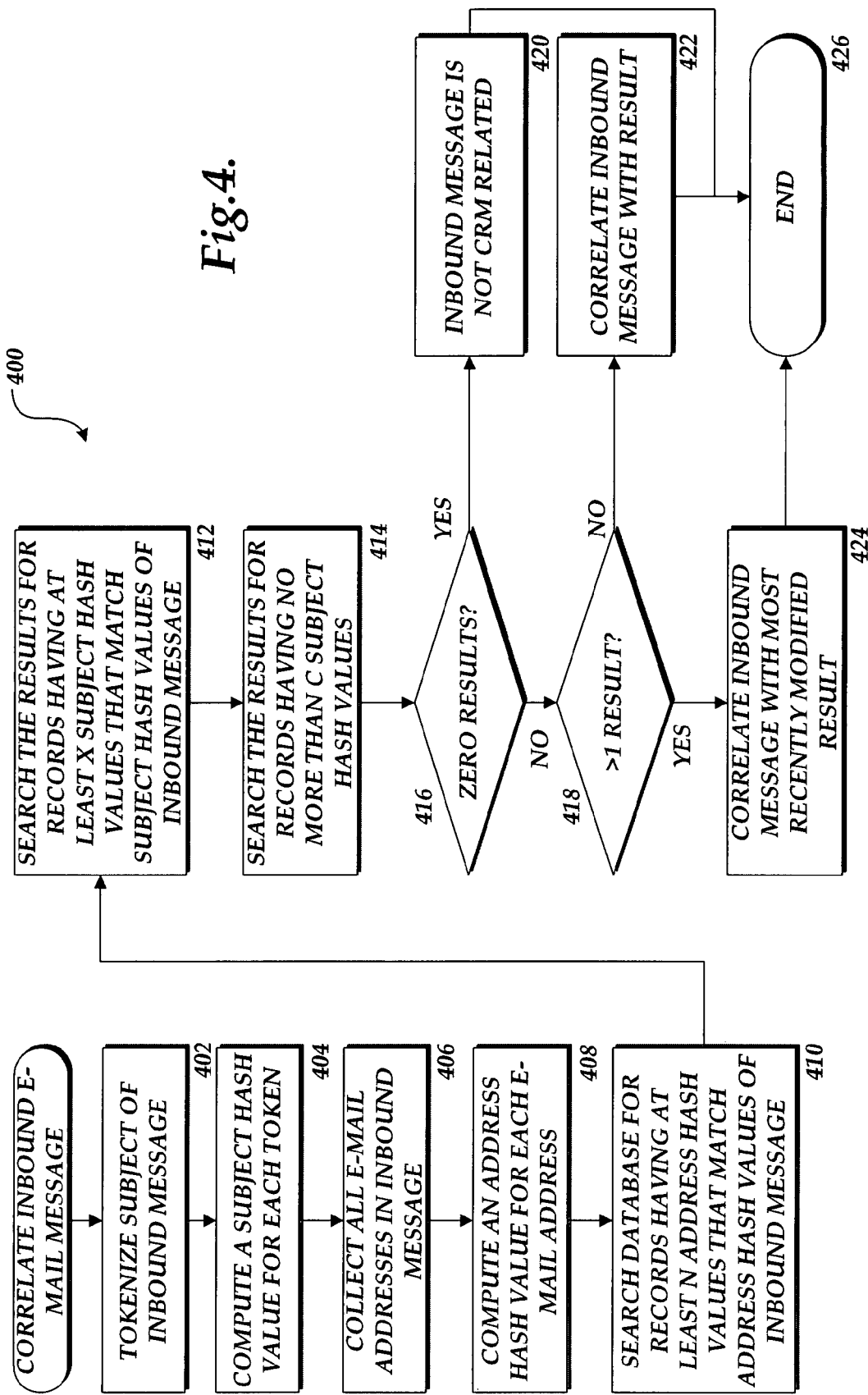
FIG. 4 is a flow diagram showing a process for identifying and correlating an incoming e-mail message to an existing e-mail message utilized in one embodiment presented herein.

Turning now to FIG. 4, a routine 400 will be described that illustrates one illustrative process performed by the CRM application 108 for correlating an incoming e-mail message to a pre-existing related e-mail message identified in the CRM database 110. The routine 400 begins at operation 402, where the subject field of the incoming e-mail message to be correlated is tokenized in the manner described above with respect to FIG. 2. The routine 400 then continues to operation 404, where a subject hash value 316 is computed for the generated tokens in the same manner as described above with reference to FIG. 2.

From operation 404, the routine 400 continues to operation 406, where all of the e-mail addresses in the recipient fields of the incoming e-mail message are collected. The routine 400 then continues to operation 408, where an address hash value 312 is generated for each of the collected e-mail addresses. From operation 408, the routine 400 continues to operation 410.

At operation 410, the CRM application 108 performs a search of the e-mail hash table 320. In particular, a search is made of the e-mail hash table 320 to locate e-mail hash records 322 stored therein that have at least a pre-defined number (referred to herein as "N") of address hash values 318 that match the address hash values computed for the incoming e-mail message. The routine 400 then continues to operation 412, where the results of the search performed in operation 410 are searched for any e-mail hash records 322 that have at least a pre-defined number (referred to herein as "X") of subject hash values 318 that match the subject hash values computed for the incoming e-mail message. It should be appreciated that, through the searches performed at operations 412 and 414, e-mail messages identified in the CRM database 110 are located that have at least N address hash values and X subject hash values in common with the incoming e-mail message. The e-mail messages may be referred to herein as correlation candidate e-mail messages.

From operation 412, the routine 400 continues to operation 414, where the results of the search performed in operations 410 and 412 are searched for any records that have no more than a pre-defined number (referred to herein as "C") of subject hash values. By eliminating potential correlation candidate e-mail messages that have more than C subject hash values, overfitting can be avoided. It should be appreciated that although described herein as separate operations, the searches described above with reference to operations 410, 412, and 414 may be performed utilizing a single SQL search query. It should also be appreciated that N, X, and C may be modified to improve the accuracy of the correlation algorithm described herein.

From operation 414, the routine 400 continues to operation 416, where a determination is made as to whether the results of the searches performed at operations 410, 412, and 414 yielded no correlation candidate e-mail messages (i.e. no matching e-mail hash records were returned). If no candidates were identified, the incoming e-mail message is considered to be unrelated to the e-mail messages identified in the e-mail hash table 320. The routine 400 therefore proceeds from operation 416 to operation 420, where an indication may be provided that the incoming e-mail message is not related to the activities of the CRM system 102. If one or more candidates were identified, the routine 400 continues from operation 416 to operation 418.

At operation 418, a determination is made as to whether more than one candidate e-mail messages was identified during the searches performed at operations 410, 412, and 414. If only one candidate was located, the routine 400 proceeds to operation 422, where the inbound e-mail message is correlated with the e-mail message referenced by the matching e-mail hash record 322. This may be performed, for instance, by assigning the incoming e-mail message the same activity identifier 310 as contained in the matching e-mail hash record 322. If more than one candidate was identified, the routine 400 proceeds from operation 418 to operation 424, where the inbound e-mail message is correlated with the most recently modified e-mail message referenced by the matching e-mail hash records (i.e. the most recently modified candidate). From operations 420, 422, and 424, the routine 400 continues to operation 426, where it ends.

Figure 5:
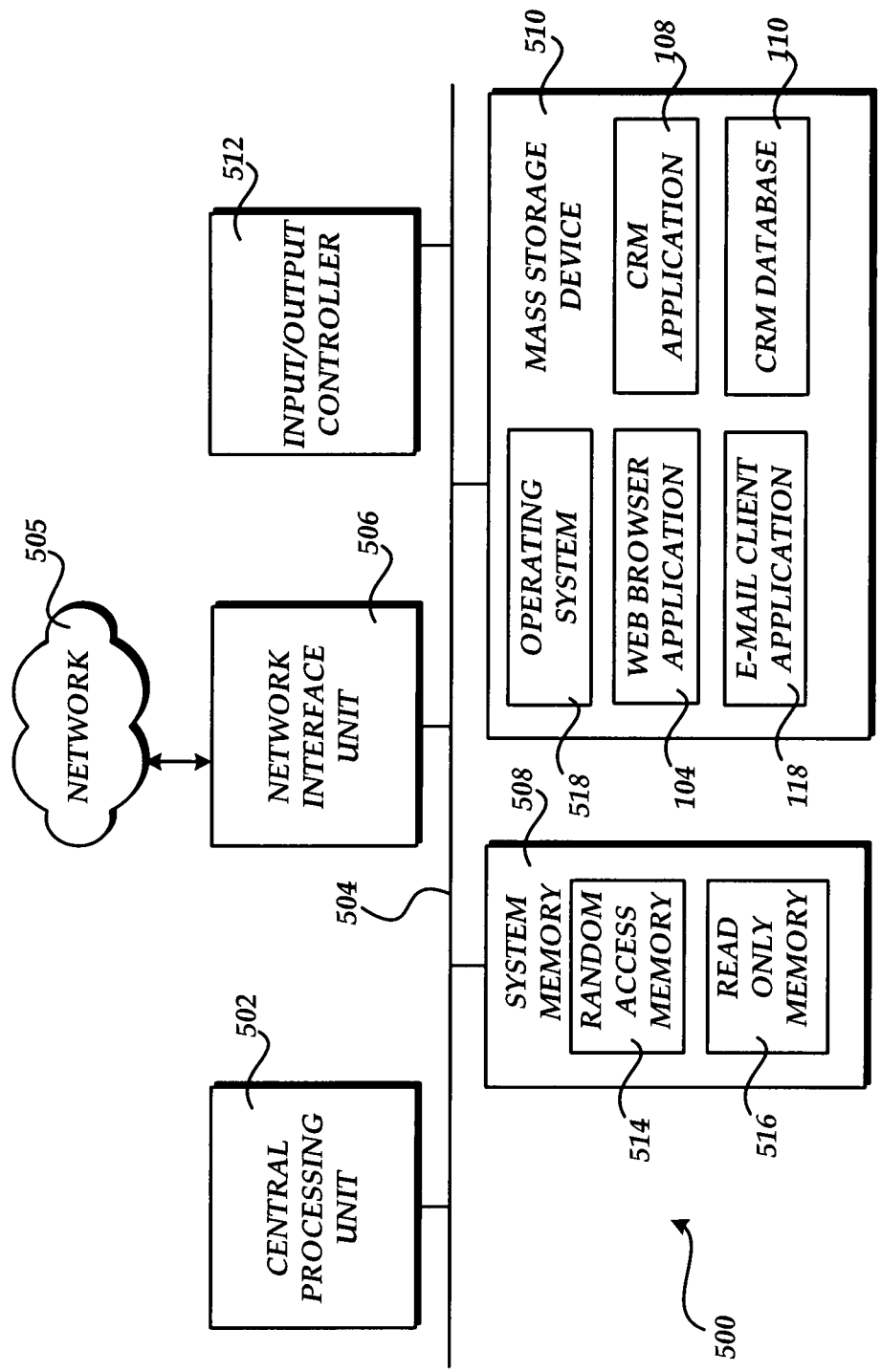
FIG. 5 is a computer architecture diagram showing an illustrative hardware architecture suitable for implementing the computing systems described with reference to FIGS. 1-4.

Referring now to FIG. 5, an illustrative computer architecture for a computer 500 capable of executing the software components described above with respect to FIGS. 1-4 will be discussed. The computer architecture shown in FIG. 5 illustrates a conventional desktop, laptop, or server computer and may be utilized to embody any of the computer systems described herein.

The computer architecture shown in FIG. 5 includes a central processing unit 502 ("CPU"), a system memory 508, including a random access memory 514 ("RAM") and a read-only memory ("ROM") 516, and a system bus 504 that couples the memory to the CPU 502. A basic input/output system containing the basic routines that help to transfer information between elements within the computer 500, such as during startup, is stored in the ROM 516. The computer 500 further includes a mass storage device 510 for storing an operating system 518, application programs, and other program modules, which will be described in greater detail below.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated that computer-readable media can be any available media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 operates in a networked environment using logical connections to remote computers through a network such as the network 505. The computer 500 may connect to the network 505 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system suitable for controlling the operation of a networked desktop, laptop, or server computer. The mass storage device 510 and RAM 514 may also store one or more program modules. In particular, the mass storage device 510 and the RAM 514 may store the web browser application program 104, the e-mail client application program 118, the CRM application 108, and the CRM database 110, each of which has been described above with reference to FIGS. 1-4. Other program modules may also be stored in the mass storage device 510 and utilized by the computer 500.

According to other embodiments, the CRM application 108 may provide a user interface accessible through the web browser application 104 for correcting an erroneous correlation. For instance, if the CRM application 108 incorrectly correlated an incoming e-mail message to an unrelated e-mail message or CRM object, a user would be able to correct the erroneous correlation through the user interface by correlating the incoming e-mail message to a related e-mail message or CRM object. According to other aspects, the user interface may display a confidence level for each correlation performed by the CRM application 108. If the confidence level is above a certain pre-defined threshold, a user may not be permitted to modify the correlation. According to other embodiments, a user may be permitted to add a correlation where the CRM application 108 did not detect one. Alternately, if a message is identified as CRM-related but not appropriately correlated, a link will not be created for the message.

It should also be appreciated that although the various processes presented here have been described as being performed by the CRM application 108, other types of programs executing on other types of computing systems may perform these processes. For instance, in another implementation, the functionality provided herein for identifying and correlating e-mail messages may be integrated within an e-mail client application 118. Through the integration of this functionality, the e-mail client application 118 can associate related e-mail messages to one another and display related messages according to threads. The functionality described herein may also be utilized within a web-based e-mail system or other type of e-mail system.

It should also be appreciated that the implementations described herein provide for greater security than previous solutions that utilized tracking tokens. Utilizing previous solutions, tracking tokens could be predicted and forged by a malicious user. Utilizing the implementations presented herein, subject and recipients must match closely enough for e-mail messages to be identified and correlated to the same context. It would be very difficult for a malicious user to attack the process described herein. Moreover, it should also be appreciated that previous solutions that utilize tracking tokens require a decision to be made at the time an e-mail message is sent as to whether the e-mail will be tracked. Utilizing the processes presented herein, the decision can be made at a later time and correlation can still be provided for subsequent reply messages.

Based on the foregoing, it should be appreciated that technologies for identifying and correlating e-mail messages are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for identifying and correlating an incoming electronic mail (e-mail) message to a computing system with an outbound e-mail message previously transmitted by the computing system and referenced in a database stored by the computing system, the method comprising performing computer-implemented operations for:

processing outbound e-mail messages from the computing system by identifying data stored in a subject field and an address field of the outbound e-mail messages and storing secure hash values generated from a secret key in the database for the data stored in the subject field and the address field of the outbound e-mail messages; and processing an incoming e-mail message to the computing system by determining whether hash values of data stored in a subject field excluding one or more leading words and an address field of the incoming e-mail message sufficiently match the secure hash values stored in the database for the corresponding subject field and address field of the outbound e-mail messages to correlate the incoming e-mail message with one or more of the outbound e-mail messages, and correlating the incoming e-mail message with one or more of the outbound e-mail messages in response to determining that the hash values of data stored in the subject field excluding one or more leading words and the address field of the incoming e-mail message sufficiently match the secure hash values stored in the database for the corresponding subject field and address field of one or more previously transmitted outbound e-mail messages.

2. The method of claim 1, wherein the one or more leading words comprise one or more words of a certain format and wherein the address field of the incoming e-mail message comprises a recipient field.

3. A computer-implemented method for identifying and correlating an incoming electronic mail (e-mail) message to a computing system with one of a plurality of e-mail messages sent from the computing system, each of the e-mail messages having content stored in a subject field and identifying one or more recipients by an e-mail address, the method comprising performing computer-implemented operations for:

processing e-mail messages sent from the computing system by tokenizing the content in the subject field of the plurality of e-mail messages sent from the computing system into one or more tokens, generating a subject hash value for each of the tokens, generating an address hash value for each of the e-mail addresses of the recipients of the plurality of e-mail messages sent from the computing system, and storing the subject hash values and the address hash values in a database; and processing the incoming e-mail message by tokenizing a subset of the content in a subject field of the incoming e-mail into one or more tokens message, wherein the subset excludes one or more leading words in the subject field, generating a subject hash value for each of the tokens for the subset of the content in the subject field of the incoming e-mail message, generating an address hash value for each of the e-mail addresses of recipients of the incoming e-mail message, and correlating the incoming e-mail message to one or more of the plurality of e-mail messages sent from the computing system using the subject hash values and address hash values generated for the incoming e-mail message and the subject hash values and address hash values stored in the database.

4. The method of claim 3, wherein storing the subject hash values and the address hash values in the database comprises storing a record in the database for each of the plurality of e-mail messages sent from the computing system, each record comprising an identifier for an e-mail message, the subject hash values for an e-mail message, and the address hash values for an e-mail message.

5. The method of claim 4, wherein correlating the incoming e-mail message to one of the plurality of e-mail messages sent from the computing system using the subject hash values and address hash values generated for the incoming e-mail message and the subject hash values and address hash values stored in the database comprises:

performing a search of the database for records stored therein having at least a first threshold number of address hash values that match the address hash values generated for the incoming e-mail message;

identifying zero or more candidate e-mail messages by searching the results of the database search for records having at least a second threshold number of subject hash values that match the subject hash values generated for the incoming e-mail message; and correlating the incoming e-mail message to one of the candidate e-mail messages.

6. The method of claim 5, wherein correlating the incoming e-mail message to one of the candidate e-mail messages comprises correlating the incoming e-mail message to a most recently modified one of the candidate e-mail messages.

7. The method of claim 6, further comprising providing an indication that the incoming e-mail message is unrelated to any of the plurality of e-mail messages in response to determining that there are zero candidate e-mail messages.

8. The method of claim 7, wherein the database comprises a structured query language (SQL) database.

9. A computer-readable medium comprising a tangible article of manufacture that is not a signal, the computer-readable medium having computer-executable instructions stored thereon which, when executed by a computer, cause the computer to:

process outbound e-mail messages from a computer system by generating subject hash values and address hash values for the outbound e-mail messages and storing a record in a database for each of a plurality of outbound e-mail messages, each record comprising an identifier for the outbound e-mail message, the subject hash values and the address hash values for the outbound e-mail messages; and to process incoming e-mail messages to the computer system by receiving an incoming e-mail message having a subject field and one or more address fields, each address field having one or more recipient e-mail addresses stored therein, and in response to receiving the incoming e-mail message, to tokenize the subject field of the incoming e-mail message into a plurality of tokens, to generate a subject hash value for each of the tokens, and to generate an address hash value for each of the recipient e-mail addresses, to identify the incoming e-mail message as being related to one or more previously transmitted outbound e-mail messages using the subject hash values and the address hash values for the incoming e-mail message and the subject hash values and the address hash values stored in the database and, in response to identifying the e-mail message as being related to one or more previously transmitted outbound e-mail messages, to correlate the incoming e-mail message to the related one or more previously transmitted outbound e-mail messages by performing a search of the database for records stored therein having at least a first threshold number of address hash values that match the address hash values generated for the incoming e-mail message, identifying zero or more candidate e-mail messages by searching the results of the database search for records having at least a second threshold number of subject hash values that match the subject hash values generated for the incoming e-mail message, and correlating the incoming e-mail message to one of the candidate e-mail messages using the subject hash values and address hash values generated for the incoming e-mail message and the subject hash values and address hash values stored in the database.

10. The computer-readable medium of claim 9 having further computer-executable instructions stored thereon which cause the computer to provide an indication that the incoming e-mail message is unrelated to any of the previously transmitted outbound e-mail messages in response to determining that there are zero candidate e-mail messages.

11. The computer-readable medium of claim 10, wherein correlating the incoming e-mail message to one of the candidate e-mail messages comprises correlating the incoming e-mail message to a most recently modified one of the candidate e-mail messages.

12. The computer-readable medium of claim 11, wherein the database comprises a structured query language (SQL) database.

* * * * *